3,318,861
STEREOSPECIFIC POLYMERIZATION OF ALPHA-OLEFINS IN THE PRESENCE OF TITANIUM TRICHLORIDE, ALKYL ALUMINUM DIHALIDE AND AN ETHER
Eduard H. Adema, Beek, Johannes B. M. Laauwen and Johannes C. Soeterbroek, Geleen, Netherlands, assignors to Stamicarbon N.V., Heerlen, Netherlands
No Drawing. Filed Feb. 11, 1965, Ser. No. 431,968
Claims priority, application Netherlands, Feb. 14, 1964, 6,401,305
14 Claims. (Cl. 260—93.7)

The present invention relates to a process for the stereospecific polymerization of α-olefins having the general formula R—CH=CH$_2$, where R denotes a hydrocarbon radical containing at least two carbon atoms. In this specification and in the claims the term "stereospecific polymerization of α-olefins having the general formula R—CH=CH$_2$" will be taken to denote both the polymerization of these α-olefins, separately or combined, to a product mainly consisting of an isotactic polymer and the copolymerization of one or more of these α-olefins with one or more other unsaturated hydrocarbons, such as ethylene, propylene, butadiene or isoprene, in which copolymerization a mainly isotactic polymer is obtained, it being understood that in the case of propylene being used at most 90 mol. percent thereof may be present in the copolymer. The said term also includes the hetero-block polymerization of two or more of these α-olefins with each other, or of one or more of these α-olefins with one or more other unsaturated hydrocarbons, such as ethylene, propylene, butadiene or isoprene, the said processes yielding hetero-block polymers in which the segments consisting of these α-olefins and, possibly, also the segments built up of the other monomer(s) predominantly have an isotactic structure.

It is a matter of common knowledge that a catalyst consisting of violet titanium trichloride and a trialkylaluminium compound, or a dialkylaluminium monohalide, is very suited for effecting the stereospecific polymerization of α-olefins. On the other hand, a catalyst consisting of titanium trichloride and an alkylaluminium sesquihalide, i.e. a mixture of equimolecular amounts of dialkylaluminium monohalide and monoalkylaluminium dihalide, gives a much lower polymerization rate and a considerably lower content of isotactic product. This can be accounted for by the fact that the monoalkylaluminium dihalide acts as inhibitor in the polymerization, as is known from the German Auslegeschrift 1,058,736. Consequently, it is not surprising that a combination of titanium trichloride and a monoalkylaluminium dihalide only proves to possess no catalytic activity at all.

In the Belgian patent specification 594,407 it is stated that the activity and the stereospecificity of a catalyst composed of titanium trichloride and an alkylaluminium sesquihalide are increased by addition of organic compounds such as amines, ethers and thioethers, which can bind the dihalogen component of the cheap sesquihalide by complex-formation. This statement is obviously based on the consideration that the said inhibiting effect of the dihalide is thus cancelled, with the result that the monohalide can freely exert its proper catalytic effect.

In the polymerization of alkenes carried out with the aid of catalysts consisting of (1) possibly halogenated, hydrocarbon compounds of metals belonging to the second sub-group or the third main-group of the periodic system of the elements and (2) halogen compounds of metals belonging to the fourth, fifth or sixth sub-group of the said system, it is furthermore a known practice to add (3) compounds which, together with the catalyst components, can form complexes, such as ethers, nitriles, acetals, amines, quaternary ammonium salts and compounds containing hydroxyl groups, the said complex-forming compounds being preferably employed in amounts of 0.2–0.5 mol. per mol. of metalhydrocarbon compound (see Belgian patent specification 554,242). These additions counteract the formation of low-molecular, oily products. However, the abovementioned patent specification does not contain any indication as to a possible influence of these additions on the stereospecificity of the polymerization. Consequently, it does not in any way suggest that the special catalyst system according to the invention described below, which contains only one of the many combinations of (1) metal-hydrocarbon compounds, (2) halogen compounds of metals belonging to the fourth, fifth and sixth subgroup, and (3) complex-forming compounds that may be used according to the Belgian patent specification, is pre-eminently suited for the stereospecific polymerization of α-olefins.

The process according to the invention for the stereospecific polymerization of α-olefins having the general formula R—CH=CH$_2$, where R denotes a hydrocarbon radical containing at least two carbon atoms, with the aid of a catalyst containing (1) a hydrocarbon compound of a metal belonging to the second sub-group or the third main-group of the periodic system of the elements, (2) a halogen compound of a metal belonging to the fourth, fifth or sixth sub-group of the said system, and a (3) complex-forming compound, is characterized in that the catalyst contains (1) a monoalkylaluminium dihalide, (2) violet titanium trichloride and (3) an ether having the formula R$_1$—O—R$_2$, where R$_1$ denotes an alkyl or aralkyl group and R$_2$ an alkyl, aryl, or aralkyl group, and in that the ether and the monoalkylaluminium dihalide are employed in a molar ratio between 0.65:1 and 2.5:1.

This process has the advantage that the employed monoalkyl aluminium dihalides are cheaper and less inflammable than the aluminium trialkyls and dialkylaluminium monohalides used in the known processes.

Examples of α-olefins to which the process according to the invention can be applied are butylene-1, pentene-1, 4-methylpentene-1, hexene-1, and styrene. Especially with butylene-1 very good results are obtained.

The polymerization can be carried out under the conditions customary for this type of reactions. The temperature may vary between 0 and 250° C., and the pressure between 1 and 100 atm. or over. Preferably temperatures of 30–100° C., particularly of 40–80° C., and pressures below 20 atm., particularly of 1–12 atm., are used.

The polymerization is preferably effected in an inert liquid dispersing agent, for instance in a saturated hydrocarbon such as hexane, heptane or cyclohexane, or in gasoline, kerosene or benzene.

The catalyst may contain the alpha and/or the gamma as well as the delta-modification of the violet titanium trichloride, and also other crystalline modifications, in which another metal halide, e.g. aluminium chloride, may also be present, if so desired, in solid solution. If so desired, the titanium trichloride may be prepared by reacting titanium tetrachloride with an excess of monoalkylaluminium dihalide at a temperature of e.g. 20–120° C. It need not be recovered from the reaction mixture, as the latter, after being heated if so desired, can be used as such. By preference, a chloride, bromide or iodide with an alkyl radical containing 1-12 carbon atoms is used as monoalkylaluminium dihalide.

The ethers to be used may be symmetrical and asymmetrical aliphatic ethers as well as mixed aliphatic-aromatic ethers. Examples of suitable ethers are i.a. diethylether, di-(n.butyl)-ether, diisopropylether, diisoamylether, anisole, phenylethylether. As a rule, the ethers contain 2 to 24 carbon atoms. By preference, use is made of aliphatic ethers, as these have the highest activity and yield the largest percentage of isotactic polymer. Diisopropylether, di-(n.butyl)-ether and diisoamylether in particular give very good results.

The polymerization can be carried out in one of the customary ways, for instance by introducing the compound(s) to be polymerized, at the required temperature and pressure, into an inert, liquid dispersing agent in which the catalyst is already present, or by saturating the dispersing agent with the compound(s) to be polymerized and then adding the catalyst to it. The polymerization may furthermore be carried out as a batch process, a semicontinuous process or a continuous process.

The titanium trichloride, the monoalkylaluminium dihalide and the ether may be separately introduced into the polymerization reactor in any order desired. It is also possible first to feed two of the three catalyst components, for instance the titanium trichloride and the dihalide, into the dispersing agent, allow them to react at room temperature or at a higher temperature, for instance between 40 and 100° C., then to introduce the compound(s) to be polymerized, and, finally, to add the third component. During the reaction between the first two components these may, if so desired, be present in higher concentrations then during the polymerization reaction. It is also possible to allow the three catalyst components, prior to their introduction into the reactor, to react for some time at room temperature, but also at lower or higher temperatures, for instance at the temperature used in the polymerization. During this reaction the catalyst is preferably present in a higher concentration than during the polymerization, with the result that the formation of the catalyst is accelerated.

The concentrations of the catalyst components during the polymerization may vary widely. As a rule, the concentration of the titanium trichloride is between 2 and 50 mmoles per litre of dispersing agent, while the molar ratio between the monoalkylaluminium dihalide and the titanium trichloride usually ranges between 5:1 and 1:2. The molar ratio between the ether and the monoalkylaluminium dihalide is preferably between 0.95:1 and 1.5:1, because in this range the activity of the catalyst is highest. The most favourable results are obtained with equimolecular amounts of ether and monoalkylaluminium dihalide. At this ratio the activity is considerably higher than, for instance, at a ratio of 0.9:1.

The following examples serve to elucidate the invention without, however, restricting it.

*Example 1*

Into a 150-ml. reaction vessel provided with a stirrer and a thermostat, 50 ml. of dried oxygen-freed heptane were introduced under nitrogen. The contents of the vessel were heated to 50° C., which temperature was maintained throughout the experiment. After 2.0 mmoles of $\alpha$-TiCl$_3$ had been added, butylene-1 was passed through the reaction vessel until the nitrogen had been displaced by the butylene. Next, 2.0 mmoles of monoethylaluminium dichloride and 2.0 mmoles of di-ethylether were added in succession. After that, butylene-1 was fed into the reaction vessel for 1½ hours, the butylene pressure being kept at about 1 atm. The reaction was stopped by adding 50 ml. of methanol and 20 ml. of hydrochloric acid to the reaction mixture, which was kept at 50° C. for another hour. The reaction mixture was then separated into two layers. The heptane layer, which contained the polymer, was washed with methanol and hydrochloric acid, and after that completely dried by evaporation. The polybutylene left as residue was dried and weighed. The yield was 5.1 g., 93% of which was insoluble in boiling diethylether.

*Example 2*

Butylene-1 was polymerized in the way described in Example 1, with the difference that 100 ml. of heptane were used instead of 50 ml. and 2.0 mmoles of di-(n.butyl)-ether instead of diethylether. Now, 8.2 g. of polybutylene were formed, 95% of which was insoluble in boiling diethylether.

*Example 3*

In the way described in Example 1, but with the difference that 100 ml. of heptane were used instead of 50 ml., and 2.0 mmoles of di-(n.butyl)-ether instead of diethylether, a mixture of 50 mol. percent of butylene-1 and 50 mol. percent of propylene was polymerized for 4 hours at 50° C. and atmospheric pressure. 10.5 g. of rubber-like copolymer were obtained.

*Example 4*

Into a 3-litre reaction vessel provided with a stirrer 1.5 l. of a dried oxygen-freed gasoline fraction (boiling point 60–80° C.) were introduced under nitrogen. The contents of the vessel were heated to 60° C., which temperature was maintained throughout the experiment. Butylene-1 was passed through the reaction vessel until the nitrogen had been displaced by the butylene and the gasoline had been saturated with butylene. Then 22.5 mmoles of $\alpha$-TiCl$_3$ and the product obtained by the reaction of 45 mmoles of monoethylaluminiumdichloride with 45 mmoles of di-(n.butyl)-ether were added successively. After that, butylene-1 was fed into the reaction vessel for 5½ hours, the butylene pressure being kept at about 1 atm. The reaction was stopped by adding 225 ml. of water to the reaction mixture, which was then kept at 80° C. for 1 hour, under a nitrogen pressure of about 3 atm. Subsequently the reaction mixture was cooled to 55° C. and separated into two layers. The gasoline layer, which contained the polymer, was washed with 225 ml. of water three times, and then cooled to 0° C., while it was stirred, whereby the polybutylene-1 crystallized. The polybutylene-1 was filtered off and dried. The dry product was highly crystalline and weighed 214 g. From the gasoline layer another 15 g. of polybutylene-1 were isolated by evaporation of the gasoline.

*Example 5*

Into a 3-litre reaction vessel provided with a stirrer 1.0 l. of dried oxygen-freed heptane were introduced under nitrogen. Thereafter 50 ml. of dried oxygen-freed 4-methylpentene-1 were added. The contents of the vessel were then heated to 65° C., which temperature was maintained throughout the experiment. Subsequently 20 mmoles of $\alpha$-TiCl$_3$ and the product obtained by the reaction of 40 mmoles of monoethylaluminiumdichloride and 40 mmoles of di(n.butyl)-ether were added successively. After that 100 ml. of 4-methylpentene-1 were gradually added in 1½ hours.

The reaction was stopped by adding 150 ml. of methanol to the reaction mixture, which was then kept at 80° C. for 1 hour. Subesquently the reaction mixture was cooled to 50° C. and separated into two layers. The heptane layer, which contained the polymer, was washed with 150 ml. of water three times and then cooled to room temperature. The poly(4-methylpentene-1) was filtered off and dried. The product was highly crystalline and weighed 56 g. By evaporation of the heptane layer another 6 g. of the polymer were obtained.

It will be obvious to those skilled in the art that various changes may be made without departing from the spirit of the invention and therefore the invention is not limited to what is described in the specification, but only as indicated in the appended claims.

What is claimed is:

1. A process for the stereospecific polymerization of $\alpha$-olefins having the general formula R—CH=CH$_2$, where R denotes a hydrocarbon radical containing at least two carbon atoms, said $\alpha$-olefins being selected from the group consisting of butylene-1, pentene-1, 4-methyl pentene-1, hexene-1, styrene and mixtures thereof, said polymerization of said $\alpha$-olefins including the copolymerization and hetero-block polymerization of said α-olefins with unsaturated compounds selected from the group consisting of ethylene, butadiene and isoprene and excluding propylene, the improvement wherein catalyst is prepared from (1) a monoalkylaluminium dihalide, (2) violet titanium trichloride, and (3) an ether having the formula $R_1$—O—$R_2$, where $R_1$ is selected from the group consisting of alkyl and aralkyl groups and $R_2$ is selected from the group consisting of alkyl, aryl and aralkyl groups, the ether and the monoalkylaluminium dihalide being employed in a molar ratio between 0.65:1 and 2.5:1.

2. A process according to claim 1, wherein the ether and the moonalkylaluminium dihalide are employed in a molar ratio between 0.95:1 and 1.5:1.

3. A process according to claim 2, wherein equimolecular amounts of ether and monoalkylaluminium dihalide are employed.

4. A process according to claim 1 wherein said ether is aliphatic.

5. A process according to claim 4, wherein said aliphatic ether is selected from the group consisting of diisopropylether, di-(n.butyl)-ether and diisoamylether.

6. A process according to claim 1, wherein said α-olefin is butylene-1.

7. A process according to claim 1, wherein said α-olefin is 4-methylpentene-1.

8. A process in accordance with claim 1, wherein said α-olefin is copolymerized with an unsaturated hydrocarbon selected from the group consisting of ethylene, butadiene and isoprene, the mole ratio of α-olefin to unsaturated hydrocarbon being no less than 1:9.

9. A process in accordance with claim 1, wherein said monoalkylaluminium dihalide comprises a compound wherein said alkyl group contains 1–12 carbon atoms and said halide is selected from the group consisting of chloride, bromide and iodide.

10. A process in accordance with claim 9, wherein said monoalkylaluminium dihalide comprises monoethylaluminium dichloride.

11. A process in accordance with claim 1, wherein said catalyst also comprises another metal halide.

12. A process in accordance with claim 1, wherein said ether contains 2–24 carbon atoms.

13. A process in accordance with claim 12, wherein said ether is selected from the group consisting of diethyl ether, di-(n.butyl)-ether, diisopropylether, diisoamylether, anisole and phenylethylether.

14. A process in accordance with claim 1, wherein the polymerization is effected in an inert liquid dispersing agent and the concentration of $TiCl_3$ is between 2 and 50 mmoles per liter of dispersant.

References Cited by the Examiner

UNITED STATES PATENTS 3,081,287   3/1963   Coover et al. _____ 260—93.7

JOSEPH L. SCHOFER, *Primary Examiner.*

M. KURTZMAN, *Assistant Examiner.*